(12) United States Patent
Tyree (10) Patent No.: US 7,621,194 B1
(45) Date of Patent: *Nov. 24, 2009

(54) SINGULAR MOTOR FOR ATTACHMENT TO MULTIPLE HOST IMPLEMENTS

(76) Inventor: Hillard Tyree, 98 Coral Way, Hamilton, OH (US) 45013

( * ) Notice: Subject to any disclaimer, the term of this patent is extended or adjusted under 35 U.S.C. 154(b) by 508 days.

This patent is subject to a terminal disclaimer.

(21) Appl. No.: 11/497,095

(22) Filed: Aug. 1, 2006

(51) Int. Cl.
*A47J 43/08* (2006.01)
(52) U.S. Cl. .................... 74/16; 56/2; 56/16.7
(58) Field of Classification Search .......... 56/2, 56/16.7; 74/16
See application file for complete search history.

(56) References Cited

U.S. PATENT DOCUMENTS

| | | | |
|---|---|---|---|
| 3,040,590 A | 6/1962 | Smithburn | |
| 3,603,162 A | 9/1971 | Gohler | |
| 4,343,139 A | 8/1982 | Lowry et al. | |
| 4,354,564 A | 10/1982 | Watanabe et al. | |
| 4,389,836 A | 6/1983 | Lowry et al. | |
| 4,446,679 A | 5/1984 | Thomas | |
| 5,449,140 A | 9/1995 | Lastowski | |
| 5,526,708 A | 6/1996 | Hill | |
| D375,963 S | 11/1996 | Braun et al. | |
| 5,771,670 A | 6/1998 | Perry | |
| 5,787,693 A | 8/1998 | Dyke | |
| 5,826,414 A | 10/1998 | Lenczuk | |
| 6,003,611 A | 12/1999 | Martinez | |
| 6,359,344 B1 | 3/2002 | Klein et al. | |
| 6,370,854 B1 * | 4/2002 | Moore | 56/17.2 |
| 6,606,845 B1 | 8/2003 | Spies | |
| 6,643,959 B2 * | 11/2003 | Jolliff et al. | 37/244 |
| 6,722,445 B2 | 4/2004 | Ohta et al. | |
| 6,922,981 B1 | 8/2005 | Tyree | |
| 6,938,699 B2 * | 9/2005 | Templeton et al. | 172/13 |
| 7,384,064 B2 * | 6/2008 | Thomas et al. | 280/731 |

* cited by examiner

*Primary Examiner*—Alicia M Torres
(74) *Attorney, Agent, or Firm*—Charles R. Wilson (57) ABSTRACT

Power equipment widely used in commercial, residential and recreational settings comprises a host implement and a demountable motor. The host implement has a frame, a mounting block with a first latch component secured to the frame, a driven shaft connected to the frame with a working piece connected to one terminus and a self-locating and locking coupler on the other terminus. The demountable motor has a spacing block with a second latch component and further has a drive shaft extending through the spacing block. The drive shaft has a second self-locating and locking coupler on its terminus. When the demountable motor is positioned on the host implement, the respective couplers mechanically mate so a power from the demountable motor can be transferred to the working piece. The latch components of the mounting block and spacing block interact to hold the host implement to the demountable motor.

20 Claims, 11 Drawing Sheets

SINGULAR MOTOR FOR ATTACHMENT TO MULTIPLE HOST IMPLEMENTS

FIELD OF THE INVENTION

This invention relates to commercial, residential, and recreational power equipment, including light industrial equipment, lawn and garden equipment, home shop equipment, sporting equipment and the like. More particularly, the invention relates to power equipment having a host implement designed for a specific work purpose and a singular demountable motor readily usable on several different purpose host implements with minimal changeover effort.

BACKGROUND OF THE INVENTION

Small motors are used to drive numerous pieces of power equipment. Equipment used commercially such as portable conveyors for roofing and other purposes, in-the-field welders, pressure washers, trenchers, etc. may be used daily depending on the business. Power equipment for use in the home and garden is used periodically as needed, often on a very occasional basis. Lawn mowers, both walk-behind and riding, lawn edgers, weed trimmers, and snow blowers are examples of power equipment which can be found in the typical suburban home. Wood lathes, sanders, table saws, and drills are examples of power equipment which are more specialized, though still widely found in many homes. Recreational power equipment such as ATV's, ski mobiles, boats, and bikes are experiencing increased use during vacation and week-end periods.

Numerous other examples exist of power equipment powered by a small motor. The typical power equipment has a single dedicated use. It is designed as a unit with a motor and an implement driven by the motor. The end result is that the typical business or home has numerous pieces of power equipment which must be stored until the need arises for its use. If the motor or any part of the implement is damaged beyond repair, the whole piece of equipment is thrown out. Needless to say, there is a tremendous waste of equipment both during times of non-use and when disposal of partly damaged equipment occurs.

Equipment designed to do multi work tasks has been designed to address the aforediscussed need. Thus, there is power equipment which has a frame with a motor and various attachments, each designed for a specific work task, e.g. grass trimming, sidewalk edging, and debris blowing. If an attachment is damaged, it is replaced at a reasonable cost. U.S. Pat. No. 3,603,162 describes one such piece of equipment.

There also have been attempts at providing larger power equipment where a single motor can be used to run various devices. U.S. Pat. Nos. 3,040,590, 5,449,140, 5,526,708, and 5,787,693 contain descriptions of such equipment. The described products have not found widespread use. My U.S. Pat. No. 6,922,981 discloses power equipment having individual host implements designed for performing several different work tasks. A single demountable motor is adapted and designed for attachment to any one of the several individual host implements. A latch is used to securely hold the demountable motor to the selected host implement.

There is still a need for power equipment where a singular motor can be used on numerous host implements, each designed for a different work task. The motor must be readily unlatched, moved from implement to implement as needed, and relatched with a minimum of effort. The implement itself must be able to receive the motor without equipment modification and without a need for tools such as wrenches or screw drivers. Most people simply do not want to use the effort or feel they lack sufficient skills to remove and install motors. In accord with this need, improved power equipment based on a singular motor capable of powering several different implements has been developed.

SUMMARY OF THE INVENTION

Power equipment used in commercial, residential and recreational settings comprise one or more host implements and a demountable motor. The host implement has a frame, a mounting block secured to a surface of the frame, a driven shaft associated with the frame and a working piece operably attached to one terminus of the driven shaft. The host implement also includes a first self-locating and locking coupler attached to the other terminus of the driven shaft. The demountable motor has a spacing block secured to a bottom surface of the motor. It also has a drive shaft and a second self-locating and locking coupler. The self-locating and locking couplers mechanically mate together to transfer power when the demountable motor is positioned on the host implement. The mounting block of the host implement and the spacing block of the demountable motor have latch components securing the host implement to the demountable motor. The demountable motor is readily installed and removed from various host implements designed for different work tasks as need dictates.

DETAILED DESCRIPTION OF THE INVENTION

The power equipment of the invention is based on a singular motor and one or more host implements. The host implements illustrated and discussed in detail below are a grass trimmer and a power washer. Numerous other host implement of all natures are contemplated for use with the singular motor.

Host implements can be broadly classified as light commercial implements, lawn and garden implements, home shop implements, and recreational implements. They can be wheeled for ease of use or ease of transport. They can also be stationary. Examples of light commercial implements include pumps, winches, hoists, and portable conveyors. Examples of lawn and garden implements include grass mowers, including walk-behind mowers, riding mowers and pull behind mowers, tillers, cultivators, edgers, brush cutters, grass trimmers, mulcher/chippers, wood splitters, trenchers, lawn vacs, post hole diggers, power washers, and snow blowers. Examples of home shop implements include air compressors, saws, including table saws and radial saws, drills, welders, wood lathes, and grinder/sanders. Examples of recreational implements include all terrain vehicles, bikes, boats, and ski mobiles. Other broad categories of implements and other implements in the above enumerated implement categories are contemplated for use in this invention. In all instances, the host implement has a driven shaft which receives rotational power from a motor and transfers that power to a working piece operably associated with the driven shaft. The working piece can be directly attached to the driven shaft or it can be indirectly driven, as by a belt. As used herein, working piece is intended to cover the member driven directly or indirectly by the driven shaft which actually performs the intended work task.

Figure 1:
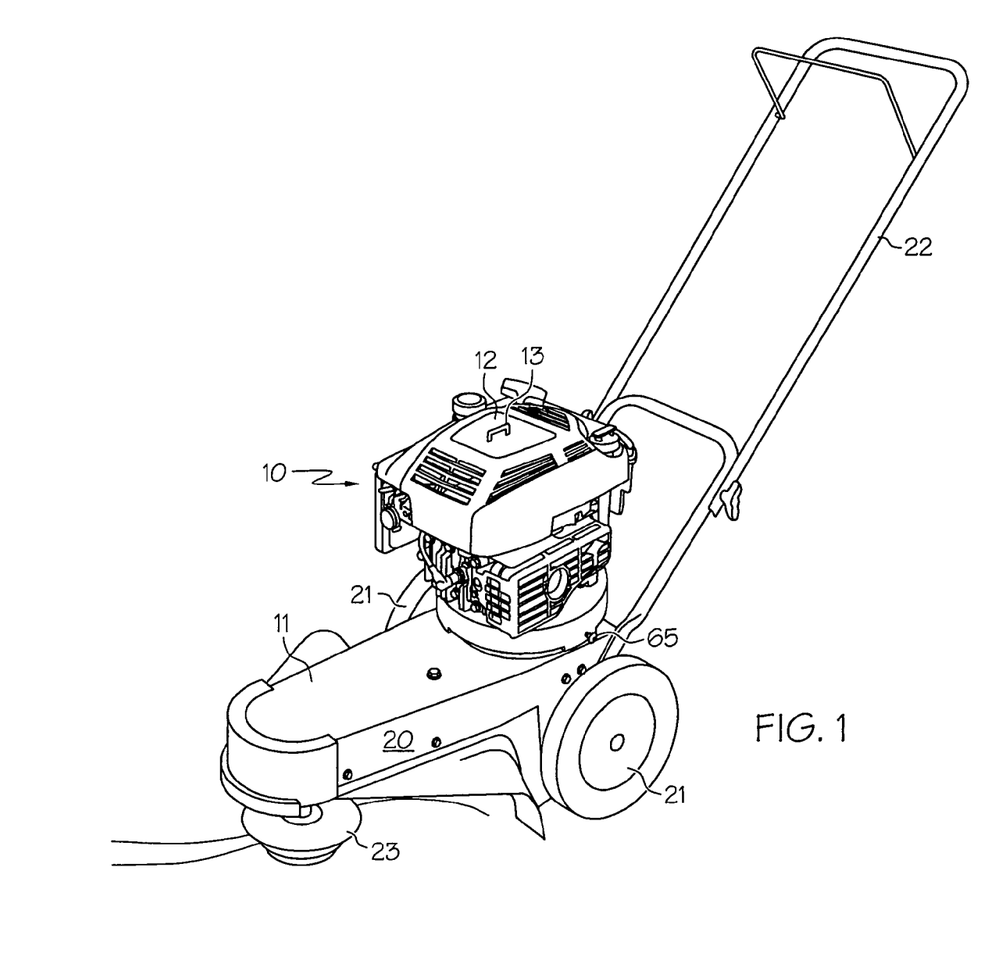
FIG. 1 is an environmental view of my power equipment which is based on a host implement designed for grass trimming and a demountable motor.
Figure 2:
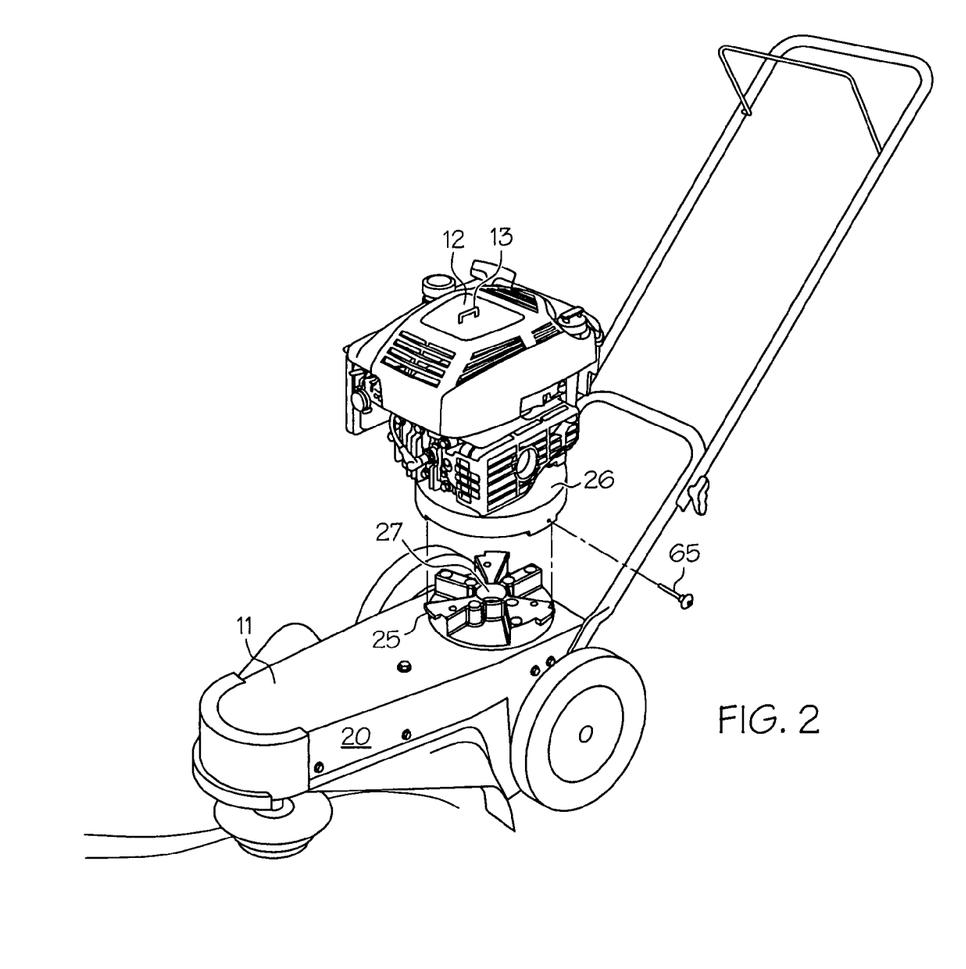
FIG. 2 depicts the power equipment of FIG. 1 in an exploded view with its demountable motor separated from its host implement.
Figure 13:
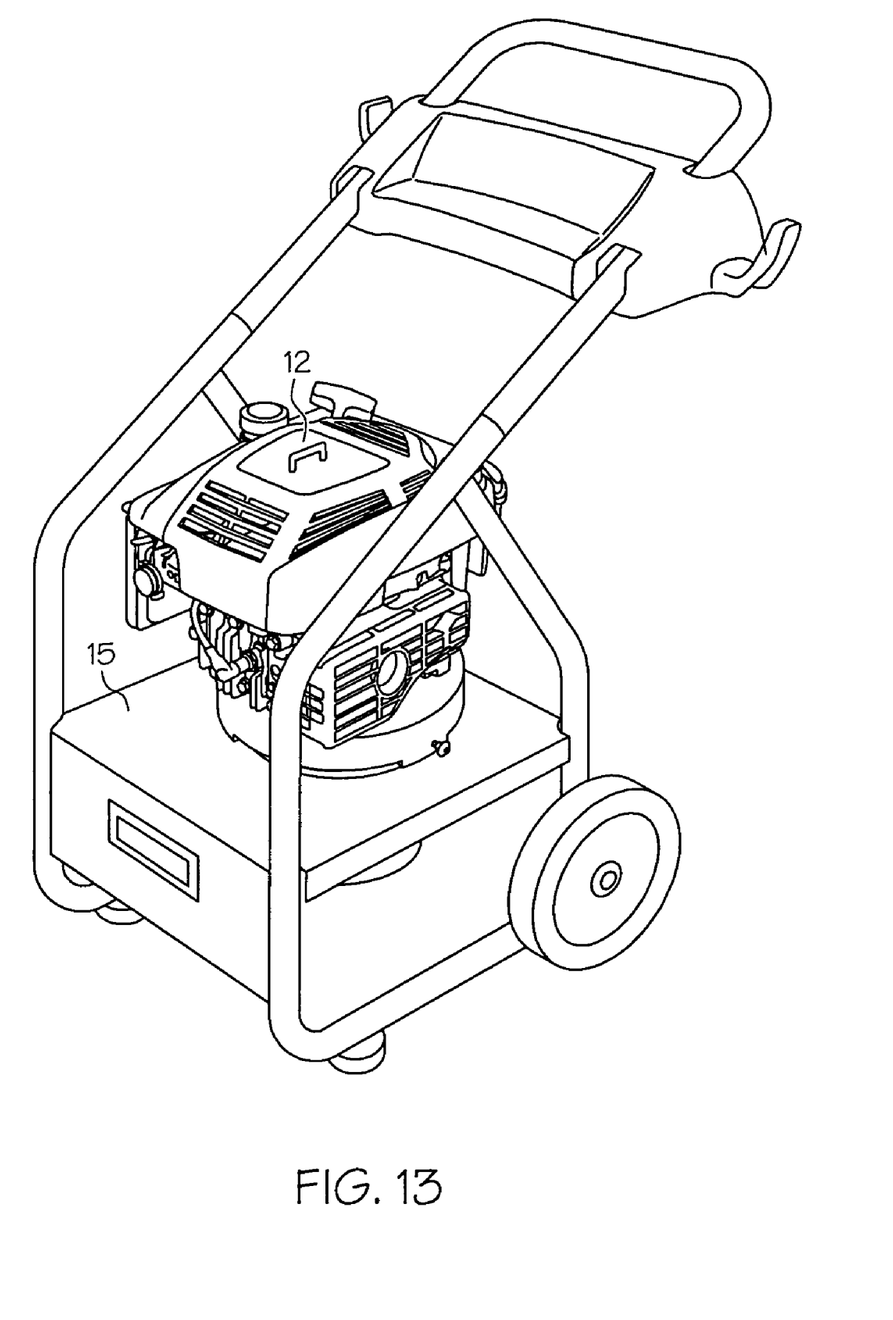
FIG. 13 is an environmental view of another piece of power equipment of the invention based on a host implement designed for power washing and the demountable motor shown in FIG. 1.

With reference to FIG. 1, there is shown power equipment 10 intended to trim grass and weeds. The power equipment 10 comprises a host implement 11 and a demountable motor 12. FIG. 1 shows the host implement 11 and demountable motor 12 latched together ready for work. FIG. 2 shows the demountable motor 12 detached from the host implement 11 such as occurs when the motor is being transferred to another host implement. A handle 13 on top of the demountable motor is provided for this purpose. FIG. 13 shows the demountable motor 12 secured to another host implement 15 which serves as a power washer.

The host implement 11 has a frame 20, an axle attached to the frame with two wheels 21, a handle 22 with operating controls and a working piece 23. The working piece 23 is comprised of a spool wound with a synthetic cutting line. A belt connected to a driven shaft to transfer power from the demountable motor 12 to the working piece 23 is not depicted in FIG. 1, though is well known and conventional in operation. The driven shaft, also not shown in FIGS. 1 and 2 is connected to the host implement in a conventional manner.

In accord with this invention and with reference to FIG. 2, the host implement has a mounting block 25 secured to its frame's top surface. The mounting block 25 is preferably made of plastic and is generally cylindrical-shaped. It is configured to latch to a spacing block 26 found on the demountable motor 12. A hole 27 extends through the mounting block 25 in its approximate center. It accommodates self-locating and locking couplers and roller bearing assemblies discussed in detail below. A more detailed description of the mounting block 25 and its latching interaction with the spacing block 26 secured to the bottom of the demountable motor 12 is found below with reference to FIGS. 6-9.

Figure 3:
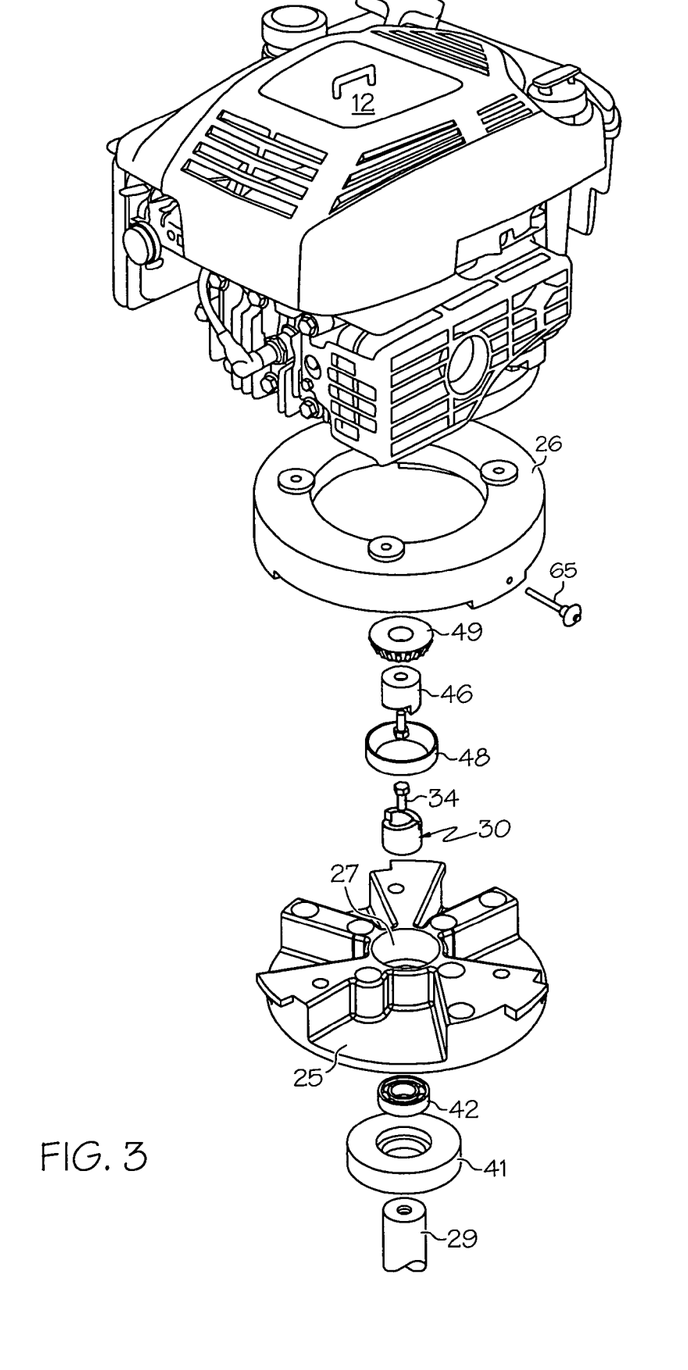
FIG. 3 is an exploded view in perspective of the demountable motor of the power equipment of FIG. 1 and operably associated components of the host implement.
Figure 4:
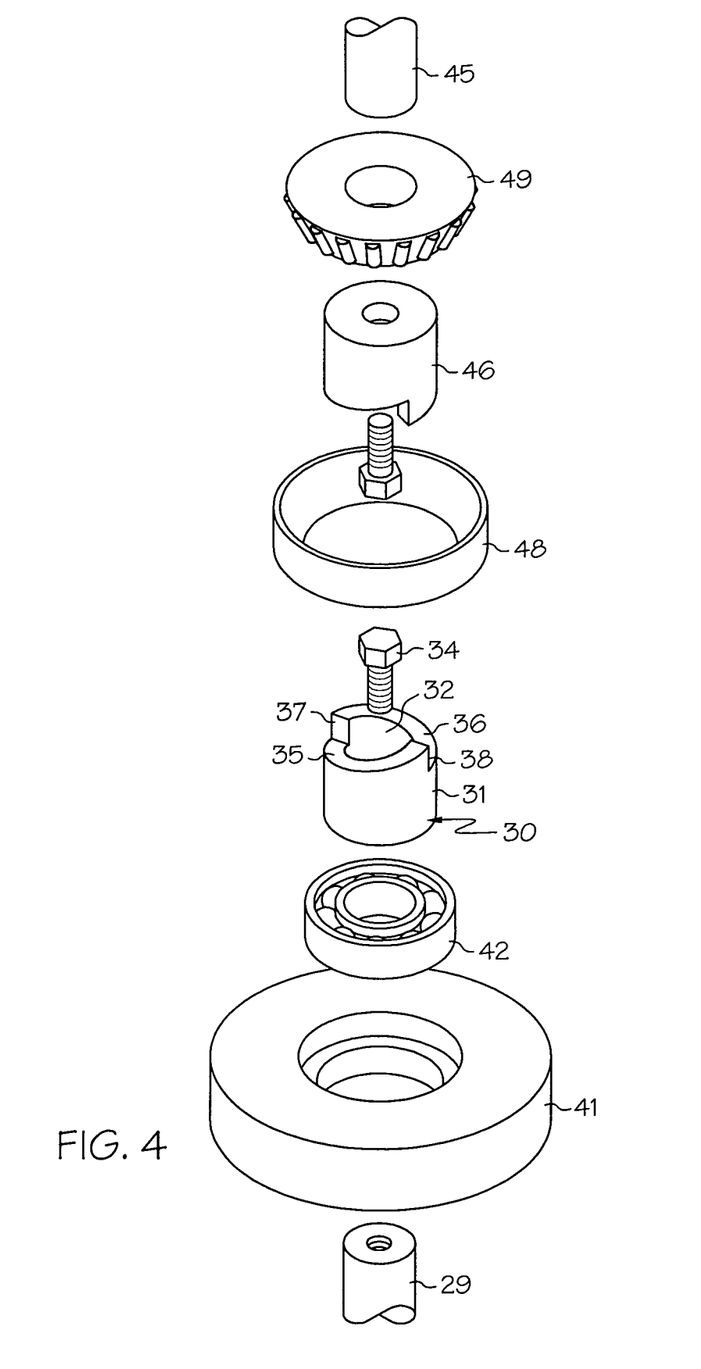
FIG. 4 is an exploded view in perspective of the demountable motor's drive shaft, the host implement's driven shaft and operably associated components.
Figure 5:
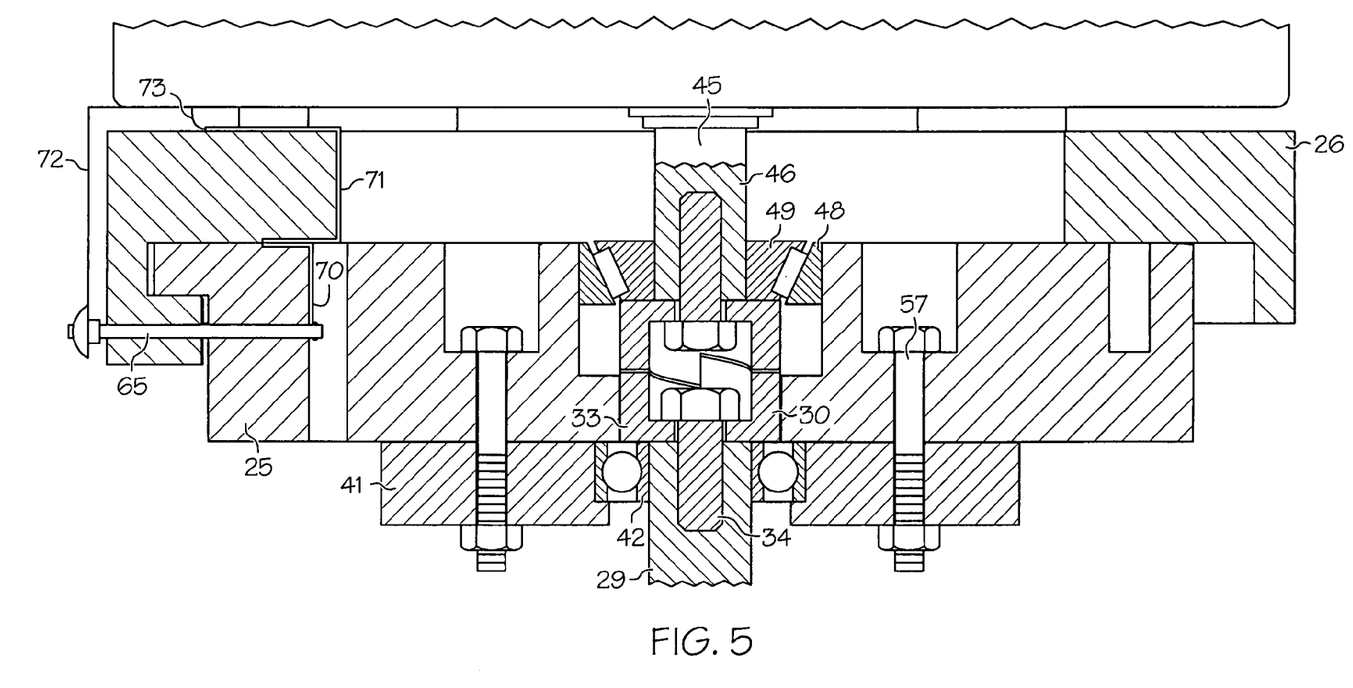
FIG. 5 is a partial section view of the power equipment of FIG. 1 showing both latch components and drive/driven shafts of the host implement and the demountable motor operably coupled together.

With reference to FIGS. 3-5, there is shown a portion of the host implement's driven shaft 29. It extends vertically as shown. It should be understood the driven shaft of the host implement could as well have a horizontal orientation. A first self-locating and locking coupler 30 is secured to a terminus of the driven shaft 29. The coupler 30 has a cylindrical-shaped body 31 with a centered bore hole 32 extending axially from the top surface of a first terminus partially into the member to create a shoulder 33 on which a head of a bolt 34 rests. A smaller bolt hole continues from the shoulder 33 to a second terminus of the cylindrical-shaped body 31. The bolt 34 extends through the bolt hole into a threaded bolt hole extending axially into the driven shaft 29.

The coupler 30 is further characterized in having two opposed spiral ramps extending from the first terminus of the coupler, preferably at least about one-fourth vertical inch and more preferably about one-fourth inch to about three-fourths inch. A first spiral ramp 35 extends downwardly an approximate half-turn to a mid-line extending horizontally through a center of the cylindrical-shaped body 31. A second spiral ramp 36 extends downwardly an approximate half-turn and to the same mid-line, though in an opposite direction. Each ramp has a flat engaging surface. The two flat surface ramps have a first vertical stop wall 37 and a second vertical stop wall 38 at the end of the respective ramps. Each vertical stop wall is preferably at least about one-fourth inch in height, more preferably about one-fourth inch to about three-fourths inch.

The spiral ramps and stop walls of the first self-locating and locking coupler 30 are used to mechanically mate with spiral ramps and stop walls of a second self-locating and locking coupler 46 associated with the demountable motor. As apparent in FIG. 5, the spiral ramps of the two couplers do not have to touch and preferably do not so as to allow a proper mounting and smoother transferring of power. The stop walls 37 and 38 when engaged by stop walls of the second self-locating and locking coupler cause motion in the drive shaft to rotate the driven shaft.

Still with reference to FIG. 5, a roller bearing assembly 40 is associated with the driven shaft 29. It is not always needed, though its inclusion is preferred to ensure the driven shaft 29 rotates smoothly without substantial vibration, particularly when the driven shaft is being used to run a pulley associated with the working piece. The roller bearing assembly 40 comprises a bearing block 41 bolted to the bottom of the mounting block 25 and a roller bearing race 42 positioned within the bearing block 41 and encompassing the driven shaft 29. Such roller bearing assemblies for this purpose are well known and commercially available. Bushings can be used in place of the roller bearing assemblies when greater torque is encountered.

As should be apparent, the mounting block 25 and the hole 27 are dimensioned to receive the drive shaft 45 of the demountable motor 12. The height of the mounting block 25 is dependent primarily on the length of the drive shaft on the demountable motor. The diameter of the hole 27 is sufficiently large to receive the couplers and the roller bearing assembly 40.

The demountable motor 12 of the power equipment 10 is gas powered. It can as well be electric powered, AC or DC. Commercially available motors having about one-half HP to about eighteen HP are typically used in the invention. Smaller or larger motors can be used. If the host implement requires a more horizontally disposed drive shaft, then the demountable motor is so positioned. While not shown in detail, the demountable motor 12 has customary starting means and operating controls, e.g. a choke and throttle.

Again with reference to FIGS. 2 and 3, the spacing block 26 is attached to the bottom of the demountable motor 12. Bolt holes in the spacing block 26 with associated bolts and nuts (not shown) permanently hold the spacing block in place. The spacing block 26 is ring-shaped and preferably is made of plastic. Further discussion of it and its latching interaction with the mounting block 25 is found in the following paragraphs and with reference to FIGS. 6-9.

A second self-locating and locking coupler 46 is bolted to a terminus of the demountable motor's drive shaft 45. It is identical in structure and function to the first self-locating and locking coupler 30. A roller bearing assembly 47 is also operably associated with the drive shaft 45. The roller bearing assembly 47 comprises a tapered sleeve 48 permanently positioned within the recess in the hole 27 of the mounting block 25. A tapered roller bearing member 49 is positioned around the end of the drive shaft 45 and is held in place by the second self-locating and locking coupler 46 as best seen in FIG. 5. As with the roller bearing assembly 40 associated with the driven shaft, the roller bearing assembly 47 guides its associated shaft to ensure smooth running. It also serves as an aid in positioning the demountable motor onto the host implement.

As apparent in FIG. 5, the first and second self-locating and locking couplers mechanically mate when the demountable motor 12 is properly positioned on the host implement 11. During mounting, a slight downward push on the demountable motor is sufficient to rotate the drive and/or driven shafts until the spiral ramps of the first and second self-locating and locking couplers mate properly.

The latching interaction of the host implement's mounting block 25 and the demountable motor's spacing block 26 is best understood with reference to FIGS. 6-9. The mounting block 25 is generally cylindrical-shaped with a substantially flat bottom surface. It further has a substantially flat top surface with five cut-outs creating five finger-like sections emanating outwardly from the hole 27. The purpose of the cut-outs is to reduce raw material costs in producing the mounting block. There are three bolt holes 55 positioned in three of the sections near an outer periphery of the core and substantially equi-spaced. While not shown, a bolt extends though each of the holes and receives a nut on an underside of the host implement's frame so as to permanently hold the mounting block to the host implement. A second set of four bolt holes 56 are in four of the sections and are closer to the approximately centered hole 27. Each bolt hole receives a bolt 57 (seen in FIG. 5) for the purpose of holding the bearing block 41 in place.

Figure 6:
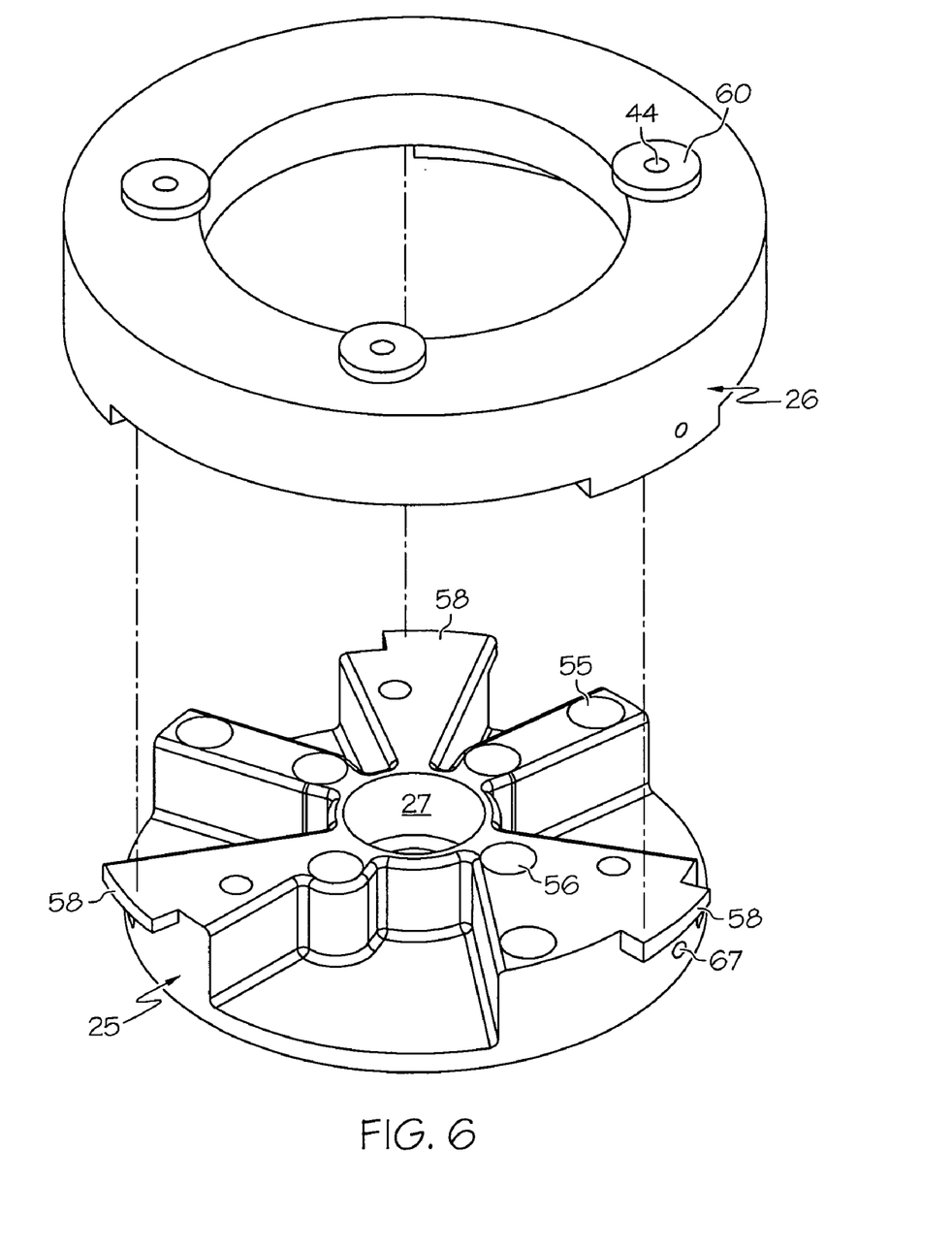
FIG. 6 is an exploded view in perspective of a mounting block of the host implement and a spacing block of the demountable motor of FIG. 1.

Still with reference to FIG. 6, the mounting block 25 has three substantially equi-spaced latching ear receptors 58 extending radially therefrom. Each latching ear receptor has a substantially flat top surface and preferably a slightly tapered undersurface. The latching ear receptors are about one-fourth inch to about one-half inch in height, about one inch to about three inches in length and about one-fourth inch to about three-fourths inch in width. These dimensions can be varied, though they must be coordinated with dimensions of latching ears found on the spacing block.

Figure 7:
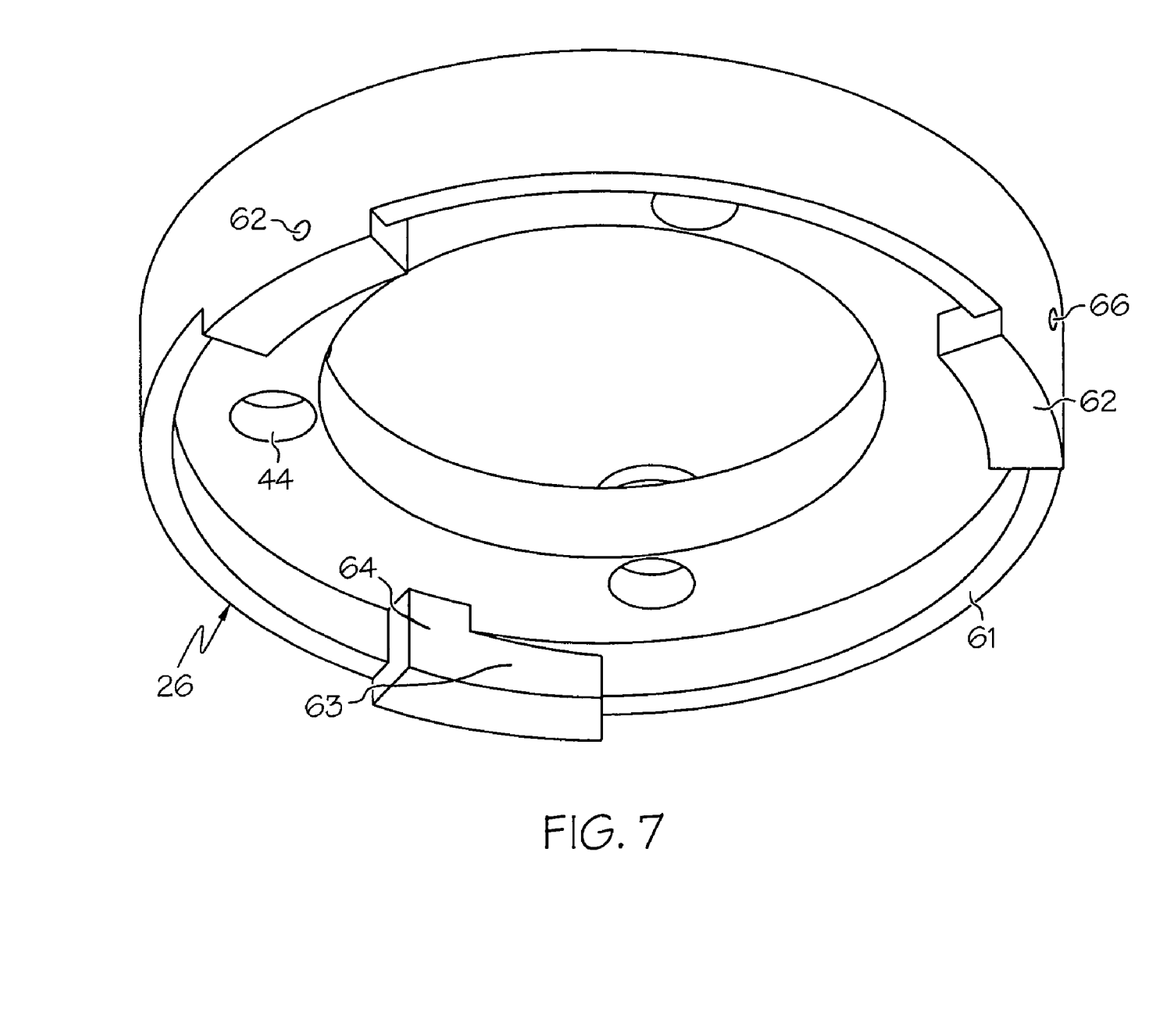
FIG. 7 is a bottom view in perspective of the spacing block of FIG. 6 showing its latching ears.

The spacing block 26 depicted in FIGS. 6 and 7 is generally ring-shaped with a substantially flat top surface and substantially flat bottom surface. It is made of plastic. Three bolt holes 44 substantially equi-spaced extend vertically therethrough. They receive bolts (not shown) which hold the spacing block to the underside of the demountable motor. Spacers 60 molded into the top surface of the spacing block overlying the bolt holes are positioned to create an air barrier to minimize heat transfer from the motor to the spacing block during operation. A centered opening reduces raw material cost in producing the spacing block and allows the drive shaft to pass through.

As best seen in FIG. 7, the spacing block 26 has an outer collar 61 extending down from its substantially flat bottom surface. Further, there are three substantially equi-spaced latching ears 62 extending from the collar 61. Each latching ear 62 is positioned essentially on an inside of the collar 61 for detachably attaching to the latching ear receptors 58 of the mounting block 25. The body of each latching ear is L-shaped with an upper surface of a long leg 63 slightly tapered to the slide under the slightly tapered undersurface of a latching ear receptor 58 of the mounting block 25. A short leg 64 acts as a stop to ensure the latching ear is fully positioned under the latching ear receptor during use. As should be apparent, each latching ear 62 is dimensioned to slide under one of the latching ear receptors 58 of the mounting block 25. They are about one-fourth inch to about one-half inch in height, about one inch to about four inches in length, and about one-fourth inch to about one inch in width.

Figure 8:
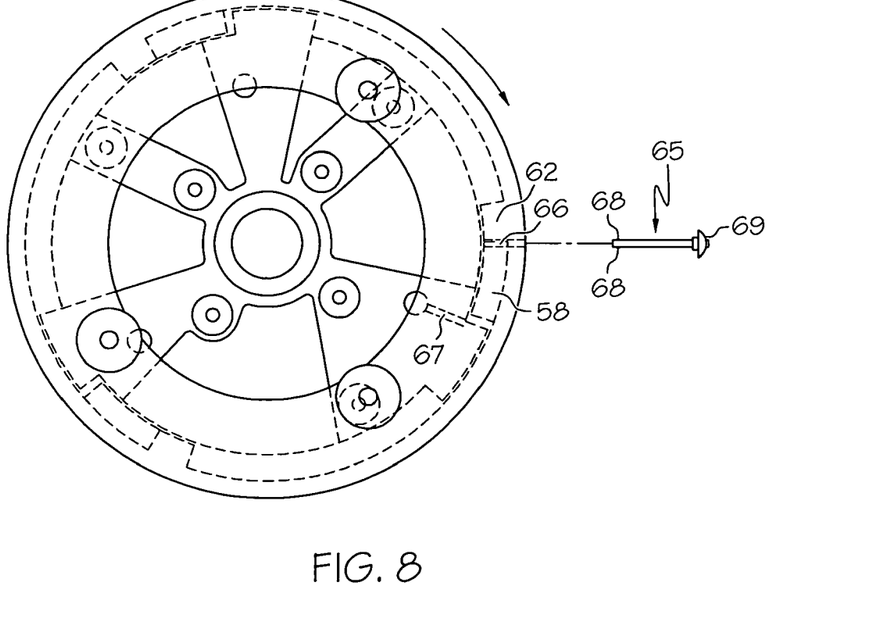
FIG. 8 is a top view of the spacing block and the mounting block of FIG. 6 showing the spacing block placed directly on the mounting block in an unlatched position.
Figure 9:
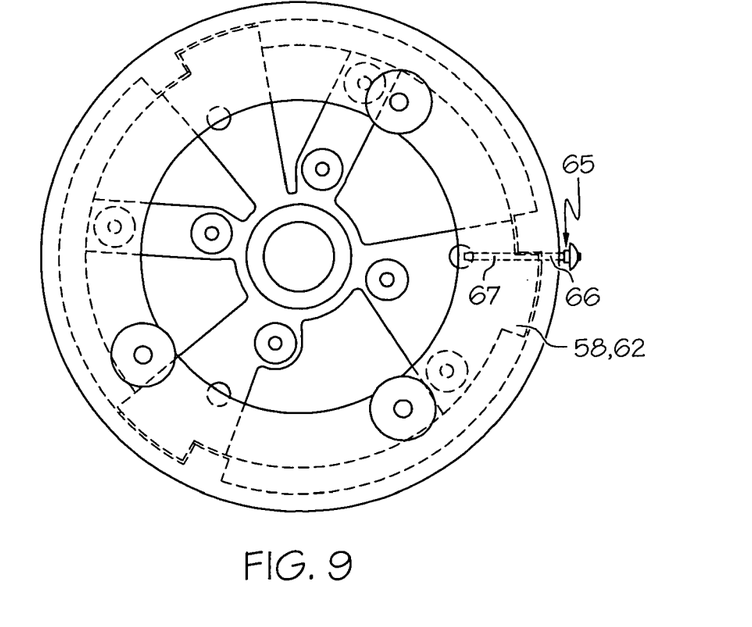
FIG. 9 is a top view of the spacing block and the mounting block of FIG. 8 showing the spacing block rotated to a position to engage the latching ears of the spacing block with the latching ear receptors of the mounting block.

FIGS. 8 and 9 show the interaction of the latching ear receptors 58 of the mounting block 25 and the latching ears 62 of the spacing block 26. In FIG. 8, the spacing block 26 is positioned directly over the mounting block 25. A rotational movement in the clockwise direction as shown forces the long leg of the L-shaped latching ears to slide under an aligned latching ear receptor until a friction fit is achieved. The friction fit results from the tapered underside of the latching ear receptor and tapered upper surface of the latching ear. A simple reverse twist releases the spacing block from the mounting block.

At least one keeper pin 65 is used to ensure that the spacing block and mounting block remain latched together during operation. Aligned holes 66 and 67 are drilled substantially horizontally through side walls of the spacing block 26 and mounting block 25 respectively. Once aligned, the keeper pin is inserted through the aligned holes, as seen in FIG. 9 to hold the blocks together. The keeper pin 65 is commercially available. It has two spring-loaded protuberances 68 near one end of the pin and a push-button head 69 at the other end which, when pushed in, allows the keeper pin to pass through the aligned holes. When the push-button head is released, the two protuberances, now outside the holes, spring outwardly to prevent the keeper pin's removal.

In a highly preferred embodiment of the invention, the keeper pin is operably associated with the demountable motor to act as a kill switch. With references to FIG. 5, a first section of metallic conductor strip 70 extends along an inside wall of the mounting block and partially along its top wall. A second section of metallic conductor strip 71 extends partially along the spacing block's bottom wall, along an inside wall, and partially along its top wall. Wiring 72 and 73 from the push head of the keeper pin 65 and the second section of conductor strip 71, respectively are connected to a solenoid of the motor 12. When the circuit is not complete, such as when the keeper pin is not fully in the aligned holes, the motor will not start or continue to run.

Figure 10:
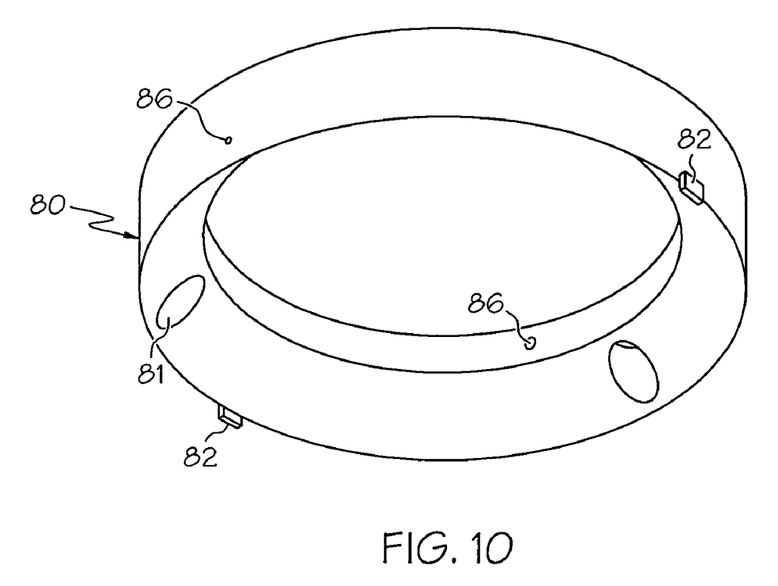
FIG. 10 is a view in perspective of an alternative spacing block for attaching to the power equipment's demountable motor of the invention.
Figure 11:
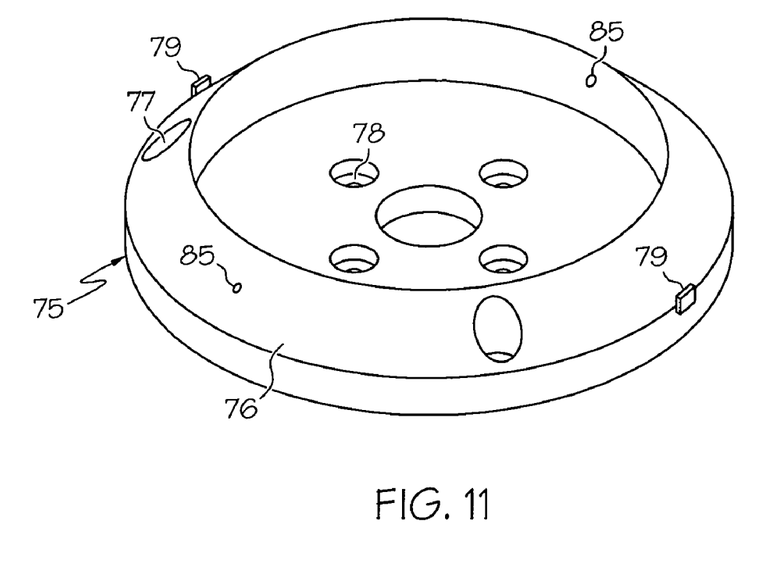
FIG. 11 is a view in perspective of a mounting block for attaching to the power equipment's host implement of the invention for use in conjunction with the spacing block of FIG. 10.
Figure 12:
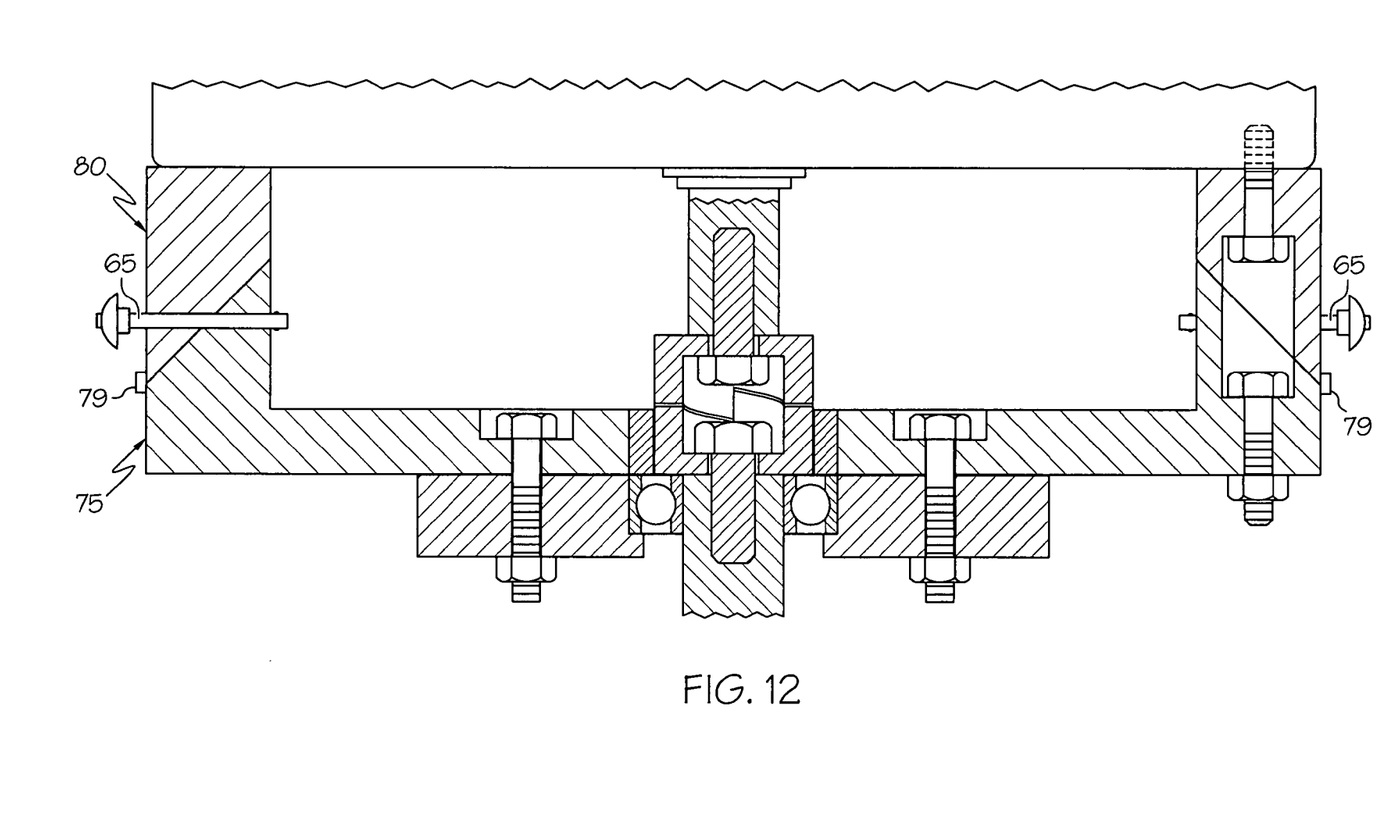
FIG. 12 is a partial side view in section showing the spacing block of FIG. 10 and mounting block of FIG. 11 operably associated with a keeper pin in place.

FIGS. 10-12 show an alternative mounting block and interacting spacing block useful with the power equipment of the invention. The mounting block 75 seen in FIG. 11 is cylindrical-shaped with a substantially flat bottom surface and a vertically extending upper annular ring member 76. The annular ring member 76 further has a tapered upper surface extending from the annular ring's outer wall to its inner wall. Bolt holes 77 used in securing the mounting block to the host implement's frame 20 and bolt holes 78 used in securing the bearing block 41 in place are provided. Further, a first set of opposed stops 79 are provided on an outside surface of the annular ring member 76 so as to extend slightly above the start of its tapered upper surface.

As seen in FIG. 10, a mating spacing block 80 is ring-shaped. It has bolt holes 81 used in securing it to the demountable motor 12. It further has a tapered bottom surface to mate with the tapered top surface of the mounting block. A second set of opposed stops 82 are also provided on an outside surface to extend downwardly and make contact with the stops 79 of the mounting block.

Horizontally disposed holes 85 extend through the mounting block and horizontally disposed holes 86 extend through the spacing block. They are each positioned so as to be aligned when the respective stops meet. Now with reference to FIG. 12, at least two keeper pins 65 identical to those described above, are inserted through the aligned holes to hold the spacing block to the mounting block during operation.

Still other means of latching the demountable motor to the host implement can be used. The primary requirements of the latching is to securely hold the motor and implement together under extreme working conditions and yet to allow them to quickly and easily unlatch when desired.

In operation, a host implement having a working piece needed for the task at hand is selected. The demountable motor is positioned on the host implement so that the respective self-locating and locking couplers mate. Latch components on the host implement and the demountable motor are engaged. Once the particular task is completed, the latch can be disconnected and the demountable motor simply lifted and positioned on another host implement for a different task. The change-over is done quickly, e.g. in less than a minute. No tools such as wrenches, screw drivers and the like are needed.

It is highly desirable that a throttle control be positioned directly on the motor to accommodate different power needs of the host implement. Also, an all weather carburetor is desired given the fact the demountable motor could be used under warm or cold weather conditions. Optional features can be included on the host implement or demountable motor to make them easier to use. For example, a handle can be installed on the demountable motor to facilitate the lifting and dropping the motor in place on the host implement. A protective cover over the demountable motor's exhaust pipe is also desirable to prevent accidental heat burn to the user during any motor changeover step. Still other features can be added to facilitate use of the power equipment can be utilized.

Minimal power loss is experienced in transferring power from the drive shaft of the demountable motor to the driven shaft of the host implement. Moreover, since continual use of the motor is now possible with several host implements and throughout the year, power loss through rust and other deterioration that occurs when a motor is only occasionally used is lessened. In effect, full use of the motor is now achieved.

It further should be apparent that a great savings is achieved by the need for only one motor to run several different host implements. For commercial use, a spare demountable motor can be made available in case the primary demountable motor breaks down or needs periodic service. Thus, a work task can be completed with minimal downtime. Even servicing is made easier since the motor alone can be taken away without having to also transport the host implement. Storage space is also saved. That is, it now becomes feasible, without the weight of a motor, to hang several host implements from a garage or shed wall. Floor space is freed for other purposes. Repair/replacement costs are also achieved in that only the damaged motor or host implement portion of the equipment needs to be repaired or replaced. The invention lends itself to inclusion on original equipment as well as part of a kit to retrofit existing conventional equipment.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

I claim:

1. Commercial, residential, and recreational power equipment based on a singular motor usable on multiple host implements, where each host implement has a dedicated working piece for performing a particular work task, said power equipment comprising:
    a. a host implement having (i) a frame, (ii) a mounting block secured to the frame, said mounting block having a coupler hole extending therethrough and having a first latch component, (iii) a driven shaft connected to the frame with a first terminus and a second terminus, (iv) a working piece operably attached to the second terminus of the driven shaft, and (v) a first self-locating and locking coupler with a coupler terminus having opposed offset spiral ramps, said opposed offset spiral ramps extending in opposite directions a half-turn so as to create a stop wall at an end of each spiral ramp wherein said first self-locating and locking coupler is attached to the first terminus of the driven shaft and extends into the coupler hole in the mounting block; and
    b. a demountable motor removably secured to the host implement, said demountable motor having (i) a spacing block secured to the motor, said spacing block having a hole extending therethrough and having a second latch component for detachably attaching to the first latch component of the host implement, and (ii) a drive shaft with a second self-locating and locking coupler attached to a terminus thereof, said second self-locating and locking coupler with a coupler terminus having opposed offset spiral ramps, each said spiral ramp extending in opposite directions a half-turn so as to create a stop wall at an end of each spiral ramp wherein said second self-locating and locking coupler extends through the hole in the spacing block and is configured to mechanically mate with the first self-locating and locking coupler on the host implement for transferring a rotation force from the drive shaft of the demountable motor to the driven shaft of the host implement for driving the working piece,
    whereby the demountable motor is readily removed from the host implement by an unlatching and lifting action, which releases the first latch component from the second latch component, and is capable of being mounted on another host implement for performing another work task.

2. The commercial, residential, and recreational power equipment of claim 1 further having roller bearing assemblies operably associated with the drive shaft of the demountable motor.

3. The commercial, residential, and recreational power equipment of claim 2 wherein the mounting block on the host implement has a recess at the top of the hole for receiving a tapered sleeve and further a tapered roller bearing member is mounted on the drive shaft of the demountable motor to fit within the tapered sleeve.

4. The commercial, residential, and recreational power equipment of claim 1 wherein each said self-locating and locking coupler has a recessed shoulder at a center of its terminus and a bolt hole to receive a bolt for attachment to the driven shaft of the host implement and the drive shaft of the demountable motor.

5. The commercial, residential, and recreational power equipment of claim 1 wherein the first and second self-locating and locking couplers each has a cylindrical-shaped body with a centered vertical bore hole extending axially from a first terminus partially into the cylindrical-shaped body to create a shoulder at a bottom of the bore hole, each of the opposed offset spiral ramps having (i) a first spiral ramp extending from the first terminus an approximate half-turn to a mid-line extending horizontally through a center axis of the cylindrical-shaped body and ending to create a first substantially vertical stop wall and (ii) a second spiral ramp extending axially from the first terminus in an opposite direction from the first spiral ramp an approximate half-turn to the mid-line and ending to create a second substantially vertical stop wall, and a vertical bolt hole extending axially from the shoulder of the centered vertical bore hole.

6. The commercial, residential, and recreational power equipment of claim 5 wherein the driven shaft of the host implement and the drive shaft of the demountable motor each has a threaded bolt hole extending axially into a terminus and further wherein a first bolt extends through the bolt hole of the first self-locating and locking coupler into the threaded bolt hole of the driven shaft and a second bolt extends through the bolt hole of the second self-locating and locking coupler into the threaded bolt hole of the drive shaft.

7. The commercial, residential, and recreational power equipment of claim 1 wherein the first latch component of the mounting block of the host implement has at least three radially extending latching ears and the second latch component of the spacing block of the demountable motor has at least three aligned latching ear receptors whereby the radially extending latching ears of the mounting block and the latching ear receptors of the spacing block interact in a detachably latching manner when the demountable motor is positioned on the host implement and partially rotated to force each latching ear to frictionally engage one of said aligned latching ear receptors.

8. The commercial, residential, and recreational power equipment of claim 7 wherein the mounting block has at least one hole extending radially therethrough and the spacing block has at least one aligned hole extending radially therethrough and further wherein a keeper pin is inserted through each set of aligned holes to secure the mounting block to the spacing block.

9. The commercial, residential, and recreational power equipment of claim 1 wherein (i) the mounting block of the host implement has a base with a tapered upper surface and further has at least two holes extending therethrough, (ii) the spacing block of the demountable motor has a base with a tapered lower surface and further at least two holes extending therethrough whereby positioning of the demountable motor on the host implement causes the tapered surfaces of the mounting block and spacing block to mate and a rotational turn of the demountable motor cause the holes in the mounting block and spacing block to align with one another, and (iii) further including keeper pins for inserting into each set of aligned holes for semi-permanently securing the demountable motor to the host implement.

10. Commercial, residential, and recreational power equipment based on a singular motor usable on multiple host implements, where each host implement has a dedicated working piece for performing a particular work task, said power equipment comprising:
   a. a host implement having (i) a frame, (ii) a mounting block secured to the frame, said mounting block having a hole extending vertically therethrough with a recessed shoulder surrounding the hole in the top surface thereof and further having a first latch component, (iii) a driven shaft connected to the frame with a first terminus and a second terminus, (iv) a working piece operably attached to the second terminus of the driven shaft, (v) a first self-locating and locking coupler attached to the first terminus of the driven shaft and extending into the hole in the mounting block, and (vi) a roller bearing assembly attached to an underside of the mounting block and operably associated with the driven shaft; and
   b. a demountable motor removably secured to the host implement, said demountable motor having (i) a spacing block secured to an underside of the motor, said spacing block having a coupler hole extending therethrough and further having a second latch component for detachably attaching to the first latch component of the host implement, (ii) a drive shaft, (iii) a second self-locating and locking coupler attached to a terminus of the drive shaft, said second self-locating and locking coupler configured to mechanically mate with the first self-locating and locking coupler on the host implement for transferring a rotation force from the drive shaft of the demountable motor to the driven shaft of the host implement for driving the working piece, and (iv) a roller bearing assembly operably associated with the drive shaft,
   whereby the demountable motor is readily removed from the host implement by an unlatching and lifting action, which releases the first latch component from the second latch component, and is capable of being mounted on another host implement for performing another work task.

11. The commercial, residential, and recreational power equipment of claim 10 wherein a bearing block is secured to an underside of the mounting block and a roller bearing race is positioned within the bearing block to encompass the driven shaft and further wherein the mounting block on the host implement has a recess at the top of the hole for receiving a tapered sleeve and further a tapered roller bearing member is mounted on the drive shaft of the demountable motor to fit within the tapered sleeve.

12. The commercial, residential, and recreational power equipment of claim 11 wherein the terminus of each of the first and second self-locating and locking couplers has opposed offset spiral ramps, each said spiral ramp extending in opposite directions from the terminus a half-turn so as to create a stop wall at the end of each spiral ramp.

13. The commercial, residential, and recreational power equipment of claim 12 wherein each said self-locating and locking coupler has a recessed shoulder at a center of its terminus and a bolt hole to receive a bolt for attachment to the driven shaft of the host implement and the drive shaft of the demountable motor.

14. The commercial, residential, and recreational power equipment of claim 10 wherein the first and second self-locating and locking couplers each has a cylindrical-shaped body with a centered vertical bore hole extending axially from a first terminus partially into the cylindrical-shaped body to create a shoulder at a bottom of the bore hole, a first spiral ramp extending from the first terminus an approximate half-turn to a mid-line extending horizontally through a center axis of the cylindrical-shaped body and ending to create a first substantially vertical stop wall, a second spiral ramp extending axially from the first terminus in an opposite direction from the first spiral ramp an approximate half-turn to the mid-line and ending to create a second substantially vertical stop wall, and a vertical bolt hole extending axially from the shoulder of the centered vertical bore hole.

15. The commercial, residential, and recreational power equipment of claim 14 wherein the driven shaft of the host implement and the drive shaft of the demountable motor each has a threaded bolt hole extending axially into a terminus and further wherein a first bolt extends through the bolt hole of the first self-locating and locking coupler into the threaded bolt hole of the driven shaft and a second bolt extends through the bolt hole of the second self-locating and locking coupler into the threaded bolt hole of the drive shaft.

16. The commercial, residential, and recreational power equipment of claim 10 wherein the first latch component of mounting block of the host implement has at least three radially extending latching ears and the second latch component of the spacing block of the demountable motor has at least three aligned latching ear receptors whereby the radially extending latching ears of the mounting block and the latching ear receptors of the spacing block interact in a detachably latching manner when the demountable motor is positioned on the host implement and partially rotated to force each latching ear to frictionally engage one of said aligned latching ear receptors.

17. The commercial, residential, and recreational power equipment of claim 16 wherein the mounting block has at least one hole extending radially therethrough and the spacing block has at least one aligned hole extending radially therethrough and further wherein a keeper pin is inserted through each set of aligned holes to secure the mounting block to the spacing block.

18. The commercial, residential, and recreational power equipment of claim 10 wherein (i) the mounting block of the host implement has an upper annular ring member with a tapered upper surface and further has at least two holes extending through the tapered upper surface, (ii) the spacing block of the demountable motor is ring-shaped with a tapered lower surface and further at least two holes extending through the tapered lower surface whereby positioning of the demountable motor on the host implement causes the tapered surfaces of the mounting block and spacing block to mate and a rotational turn of the demountable motor cause the holes in the mounting block and spacing block to align with one another, and (iii) further including keeper pins for inserting into each set of aligned holes for semi-permanently securing the demountable motor to the host implement.

19. Commercial, residential, and recreational power equipment based on a singular motor usable on multiple host implements, where each host implement has a dedicated working piece for performing a particular work task, said power equipment comprising:
    a. a host implement having (i) a frame, (ii) a mounting block secured to the frame, said mounting block having a hole extending vertically therethrough and a set of latching ear receptors extending horizontally and outwardly from a periphery thereof, (iii) a driven shaft connected to the frame with a first terminus and a second terminus, (iv) a working piece operably attached to the second terminus of the driven shaft, and (v) a first self-locating and locking coupler attached to the first terminus of the driven shaft and extending into the hole in the mounting block, said first self-locating and locking coupler having a cylindrical-shaped body with a centered vertical bore hole extending axially from a first terminus partially into the cylindrical-shaped body to create a shoulder at a bottom of the bore hole, a first spiral ramp extending from the first terminus an approximate half-turn to a mid-line extending horizontally through a center axis of the cylindrical-shaped body and ending to create a first substantially vertical stop wall, a second spiral ramp extending axially from the first terminus in an opposite direction from the first spiral ramp an approximate half-turn to the mid-line and ending to create a second substantially vertical stop wall, and a vertical bolt hole extending axially from the shoulder of the centered vertical bore hole; and
    b. a demountable motor removably secured to the host implement, said demountable motor having (i) a spacing block secured to an underside of the motor, said spacing block having a coupler hole extending vertically therethrough and having a set of latching ears for sliding under the latching ear receptors on the mounting block of the host implement, (ii) a drive shaft, (iii) a second self-locating and locking coupler attached to a terminus of the drive shaft, said second self-locating and locking coupler having a cylindrical-shaped body with a centered vertical bore hole extending axially from a first terminus partially into the cylindrical-shaped body to create a shoulder at a bottom of the bore hole, a first spiral ramp extending from the first terminus an approximate half-turn to a mid-line extending horizontally through a center axis of the cylindrical-shaped body and ending to create a first substantially vertical stop wall, a second spiral ramp extending axially from the first terminus in an opposite direction from the first spiral ramp an approximate half-turn to the mid-line and ending to create a second substantially vertical stop wall, and a vertical bolt hole extending axially from the shoulder of the centered vertical bore hole so to mechanically mate with the first self-locating and locking coupler on the host implement for transferring a rotation force from the drive shaft of the demountable motor to the driven shaft of the host implement for driving the working piece, and (iv) a roller bearing assembly operably associated with the drive shaft,
    whereby the demountable motor is readily removed from the host implement by an unlatching and lifting action, which releases the latching ear receptors from the latching ears, and is capable of being mounted on another host implement for performing another work task.

20. The commercial, residential, and recreational power equipment of claim 19 wherein the driven shaft of the host implement and the drive shaft of the demountable motor each has a threaded bolt hole extending axially into a terminus and further wherein a first bolt extends through the bolt hole of the first self-locating and locking coupler into the threaded bolt hole of the driven shaft and a second bolt extends through the bolt hole of the second self-locating and locking coupler into the threaded bolt hole of the drive shaft.

\* \* \* \* \*